United States Patent
Pittau et al.

(10) Patent No.: US 11,811,202 B2
(45) Date of Patent: Nov. 7, 2023

(54) ANGULAR ORIENTATION TOOL FOR MANUFACTURING AND CHECKING A HARNESS

(71) Applicant: AIRBUS HELICOPTERS, Marignane (FR)

(72) Inventors: Serge Pittau, La Bouilladisse (FR); Franck Martino, Port de Bouc (FR)

(73) Assignee: AIRBUS HELICOPTERS, Marignane (FR)

( * ) Notice: Subject to any disclaimer, the term of this patent is extended or adjusted under 35 U.S.C. 154(b) by 329 days.

(21) Appl. No.: 17/350,405

(22) Filed: Jun. 17, 2021

(65) Prior Publication Data

US 2022/0014000 A1 Jan. 13, 2022

(30) Foreign Application Priority Data

Jul. 10, 2020 (FR) ........................................ 2007330

(51) Int. Cl.
*H02G 1/14* (2006.01)
(52) U.S. Cl.
CPC ..................................... *H02G 1/14* (2013.01)
(58) Field of Classification Search
CPC ........................................................ H02G 1/14
See application file for complete search history.

(56) References Cited

U.S. PATENT DOCUMENTS

| | | | |
|---|---|---|---|
| 7,529,638 B2 | 5/2009 | Sawai et al. | |
| 9,090,215 B2 | 7/2015 | Diwa et al. | |
| 10,340,648 B1 | 7/2019 | Page et al. | |
| 2006/0143903 A1* | 7/2006 | Pittau | H01B 13/01209 29/749 |
| 2009/0065091 A1* | 3/2009 | Schwartz | H01B 13/01209 140/149 |
| 2021/0126418 A1* | 4/2021 | Martin | H02G 1/14 |

FOREIGN PATENT DOCUMENTS

| | | |
|---|---|---|
| EP | 0924713 A1 | 6/1999 |
| EP | 3480909 A1 | 5/2019 |
| FR | 2880464 A1 | 7/2006 |
| FR | 2937471 A1 | 4/2010 |
| JP | 3959006 B2 | 8/2007 |
| WO | 2019234080 A1 | 12/2019 |

OTHER PUBLICATIONS

Yang, Xin. Robotic Assembly of Automotive Wire Harnesses. Jul. 1, 2014. 5 pages https://www.assemblymag.com/articles/92264-robotic-assembly-ofautomotive-wire-harnesses.

French Search Report for French Application No. FR2007330, Completed by the French Patent Office, dated Mar. 9, 2021, 11 pages.

* cited by examiner

*Primary Examiner* — Pete T Lee
(74) *Attorney, Agent, or Firm* — BROOKS KUSHMAN P.C.

(57) ABSTRACT

An angular orientation tool for manufacturing and checking a harness, the harness comprising at least one connection member and at least one elongate element. According to the disclosure, the tool comprises: a fixed plate; at least one immobilization device for immobilizing the elongate element; a movable part having a degree of rotational mobility in relation to the fixed plate; at least one immobilization support configured to immobilize the connection member relative to the movable part; and a graduated angular scale for reading a relative angular orientation between the elongate element and the connection member.

10 Claims, 4 Drawing Sheets

ANGULAR ORIENTATION TOOL FOR MANUFACTURING AND CHECKING A HARNESS

CROSS REFERENCE TO RELATED APPLICATIONS

This application claims priority to French patent application No. FR 20 07330 filed on Jul. 10, 2020, the disclosure of which is incorporated in its entirety by reference herein.

TECHNICAL FIELD

The present disclosure relates to the field of tools for manufacturing harnesses and also for checking them during a design phase in order to validate or fine-tune a computer-modelled orientation or indeed subsequent to their manufacture and/or use. Such harnesses comprise at least one elongate element formed, for example, by at least one connecting wire, at least one cable and/or at least one protective sheath. Such an elongate element extends between at least two connection members or between a connection member and another elongate element, for example.

BACKGROUND

Such connection members may be formed, for example, by connectors, by rings, by lugs or indeed by an electrically conductive terminal end.

The term "harness" refers to any interconnection system, whether electrical or optical. The harness allows signals to be transferred, such as digital, analog or optical signals, for example. A harness may therefore equally be either electrically conductive or light conductive.

The electrically- or light-conductive connecting wire or wires may in particular be covered by at least one protective sheath helping protect the connecting wire or wires from friction or any contact with a foreign object. In this case, an elongate element may comprise both at least one connecting wire and at least one protective sheath.

The connection members are intended to cooperate with electrical equipment or with other harnesses and may be at least partially covered by shrink sleeves. Indeed, such shrink sleeves may be arranged so as to at least partially cover both an end of a protective sheath and an electrical connection member or so as to at least partially cover several portions of protective sheaths, in the case of a branch joint. Once shrunk, these shrink sleeves seal these connections against dust and/or water.

Moreover, once the shrink sleeves have been shrunk during a contraction operation, for example a thermal contraction operation, or possibly during an operation for cross-linking an adhesive, a sealant or the like, the connection members and the elongate element are rigidly connected to each other. Therefore, the rotation of a connection member relative to a longitudinal axis along which the elongate element extends may subject this harness to torsional stress, and even plastic deformation when the shear stress exceeds a threshold value.

Similarly, for rigid harnesses, the elongate element may be formed, for example, by an electric cable with a large cross-section. In this scenario, it may be difficult, or even impossible, to rotate a connection member relative to the longitudinal axis along which the elongate element extends. The torsional stiffness of this elongate element may therefore prevent any subsequent modification of the angular orientation of a connection member relative to the longitudinal axis of the elongate element.

When it is still possible to connect the connection member, but with high torsional stress on the elongate element and/or a connection member, vibrations the harness may experience during use may also cause it to suffer damage. Indeed, these stresses combined with vibrations may shear and/or break the elements with which such a harness cooperates.

In the aeronautical field in general, such harnesses may be produced from a first physical prototype of a model harness made directly on a model aircraft. Next, the model harness is removed from the model aircraft and one or more specific tools are produced, such as counter-forms with which the model harness cooperates in a complementary manner.

This type of specific tool is designed to hold the connection members during the phase of contracting the shrink sleeves, such that the connection members and/or the elongate element are not deformed when the harness is subsequently assembled on an aircraft. For this purpose, a tool has, at each of the connection members, a set position and orientation that are predetermined in advance, during the prototype phase.

This type of tool may form a sub-assembly, referred to a module, of a modular system used to manufacture a complete harness.

Generally, an operator arranges a plurality of tools on a complete table forming a tool specific to each harness.

An operator may also use a modular table and arrange the different modules in order to form a tooling system referred to, for convenience, as a "complete tool", as opposed to the notion of a specific tool mentioned previously. The data sheet for manufacturing a harness lists the references of the different modules to be used and the respective locations where they need to be arranged on the modular table.

The modules constrain, in particular, the relative angular orientation of the different connection members and the different branch joint sleeves in relation to the longitudinal axis of the different branches of the harness before the phase of contracting the shrink sleeves or before marking then crimping the connection members with the elongate elements.

Such a complete tool makes it possible to process, in a single operation, all of the dimensional parameters of the harness such as, in particular, the length of the branches and the relative angular orientation of the connection members and the branch joint sleeves relative to the elongate element.

The angular values of the radial orientations of the connection members and the branch joint sleeves relative to each elongate element are not specified in the work document indicating the phases of manufacturing a harness to the operator. Indeed, these angular values are defined and set by the different modules.

However, some modules may be specific to a particular type and orientation of connection member or branch joint sleeve. The number of modules required may be very considerable, depending on the number of different connection members and branch joint sleeves to be positioned on the same harness and the number of different harnesses that can be manufactured for the same aircraft and/or for several different aircraft. This can give rise to problems in terms of storing and managing these different modules or in the case of specific complete tools that cannot be broken down into several modules.

Moreover, the time required to search for and position the various modules on the modular table is not insignificant. Similarly, once the manufacture of a harness is complete, it may be necessary to remove all the modules from the modular table, identify them and store each one in a clearly marked location for possible future use.

Furthermore, such modules or specific complete tools also entail major financial costs associated with their development, design and production. Moreover, any modification in definition affecting the relative angular orientation of a connection member in relation to an elongate element entails modifying the module in question or the specific complete tool, which has an impact on the cost and the production cycle.

Finally, in the event of a problem assembling the harness on an aircraft, it is not possible to determine the cause of the problem without removing the harness from the aircraft and without positioning it once more on the tool that acts as a template.

Documents JP 3 959 006 and U.S. Pat. No. 7,529,638 describe tools for manufacturing a harness comprising at least three connectors and at least one branch joint with three branches. Such a harness may then have three-dimensional geometry but is produced on a two-axis plane. Therefore, a manufacturing phase using a predetermined angle measured on this working plane is described.

However, a harness is manufactured flat with this predetermined angle between the three branches; the orientation of the different connectors relative to each sheath section can then be modified during the subsequent assembly by the other, differently oriented protective sheath sections. Shear stress generated by torsional stresses may therefore occur in the different branches on the protective sheath and/or on the connectors and the branch joints.

Document U.S. Pat. No. 9,090,215 relates to a harness comprising a branch joint with three branches for orienting wires in a single predetermined relative orientation.

Furthermore, in order to manufacture harnesses, the use of tools as described in documents EP 0 924 713, WO 2019/234080, FR 2 880 464, U.S. Pat. No. 10,340,648 B1 or the article "Robotic Assembly of Automotive Wire Harnesses" published by Xin Yang on Jul. 1, 2014 and available on the website https://www.assemblymag.com/articles/92264-robotic-assembly-ofautomotive-wire-harnesses, is also known.

Although these tools may comprise a fixed plate and an immobilization support for immobilizing a connector, they do not make it possible to eliminate the torsional stresses generated when assembling the harness on an aircraft.

SUMMARY

The object of the present disclosure is therefore to propose an alternative tool for manufacturing harnesses that helps overcome the above-mentioned limitations. Moreover, such a tool may also help limit the number of different modules and also to dispense with the need for a modular table for manufacturing different harnesses. It also helps limit, or indeed ensure the absence, of any torsional stress generated during the assembly of the harness in the elongate element, the branch joints and/or the connection members.

The disclosure therefore relates to an angular orientation tool for manufacturing and checking a harness, the harness comprising at least one connection member and at least one elongate element.

This tool is remarkable in that it comprises:
a fixed plate comprising a planar portion;
at least one immobilization device for immobilizing all of part of the at least one elongate element and securing all or part of this at least one elongate element to the fixed plate;
a movable part having a degree of rotational mobility in relation to the fixed plate about an axis of rotation, the axis of rotation being arranged parallel to a longitudinal direction OX along which the at least one elongate element extends longitudinally on the fixed plate;
at least one immobilization support configured to immobilize the at least one connection member relative to the movable part and secure this at least one connection member to the movable part; and
a graduated angular scale for reading a relative angular orientation between the at least one elongate element and the at least one connection member, the relative angular orientation being defined in a plane perpendicular to the longitudinal direction OX in which the at least one elongate element extends longitudinally on the fixed plate.

In other words, such a tool allows at least one connection member to be angularly positioned and held in position relative to at least one elongate element according to a relative angular orientation in order to help manufacture a harness.

Such a tool may also be used to take measurements of the relative angular orientation of at least one connection member in relation to an elongate element on a harness, and, for example, a previously manufactured model harness. This tool can also be used to check such relative angular orientations during the manufacture of the harness or indeed once the harness has been manufactured. Such a check may be advantageous, in particular, before assembling the harness on an aircraft or during assembly if a problem is identified.

Moreover, such a tool may be used to check a relative angular orientation once the harness is totally assembled on the aircraft without it needing to be removed from the aircraft.

Since the axis of rotation of the movable part and the longitudinal direction OX of the elongate element advantageously coincide, the tool therefore allows the connection member to be rotated over a maximum angle of 360° relative to the longitudinal direction OX of the elongate element when it is used to manufacture a harness. The elongate element and the connection member can then be immobilized at a precise angular orientation. Moreover, the harness is perfectly centered on the axis of rotation of the measuring element.

The elongate element or elements may, for example, comprise several wires forming an electrically- or light-conductive cable for transmitting digital, analog or optical signals. Depending on its cross-section, such a cable may have high torsional stiffness preventing the harness from being torsionally flexible. The tool according to the disclosure may then allow the connection member to be precisely oriented relative to this cable, for example prior to angular marking or crimping of a lug, and bonding or contraction of a shrink sleeve.

The elongate element or elements may also comprise, for example, one or more flexible wires covered by a protective sheath. Since such a protective sheath has low shear strength, the tool according to the disclosure may then allow the connection member to be precisely oriented relative to protective sheath, thus protecting it against plastic deformation when assembling the harness, for example on a vehicle such as an aircraft.

Hereinafter, for the purpose of simplification, the term "connection member" may refer equally to a straight connector provided with a key or a locating pin, an angled connector, for example with an angle of 90°, a lug or indeed a branch joint with at least three branches of the harness.

Moreover, such a connection member may optionally, but not necessarily, be partially covered by a shrink sleeve.

The expression "shrink sleeve" may refer indiscriminately to a heat-shrink sleeve or any other type of sleeve for producing a seal at a connection between a connection member and an elongate element.

Moreover, such a shrink sleeve may comprise a sleeve secured by a bonding method by means of a bonding agent such as an adhesive or a sealant interposed between this sleeve, the connection member and the elongate element. Another type of shrink sleeve may also be clamped mechanically onto the connection member and the elongate element, such as a cable gland, for example.

Advantageously, the tool may comprise an angular lock for locking the movable part in position relative to the fixed plate.

In this way, it is possible, for example, to contract a shrink sleeve so as to at least partially cover the connection member and the elongate element. Similarly, once the movable part has been locked in position, a connection member can be crimped onto the elongate element.

In practice, the tool may comprise at least one guide bearing for guiding the movable part in rotation about the axis of rotation.

Indeed, such a guide bearing helps reduce the wear and friction between moving parts such as the movable part and stationary parts of the tool such as, in particular, the fixed plate. This bearing may, for example, comprise one or more parts formed from a material with a low coefficient of friction such as polytetrafluoroethylene (PTFE).

According to one example, the tool may comprise a fixed disk secured to the fixed plate, the fixed disk comprising, in order to indicate the relative angular orientation, either the graduated angular scale or a radial index intended to be arranged opposite the graduated angular scale.

Such a fixed disk may thus be secured in a flush-mounted connection with the fixed plate, for example via reversible securing means such as screws, bolts, nuts or the like, or indeed via non-reversible securing means, for example such as a bead of weld or bonding agent, etc. The fixed disk then comprises an axis of revolution that coincides with the axis of rotation of the movable part.

Such a fixed disk may then enable an operator to read a relative angular orientation of the movable part in relation to the fixed disk and therefore in relation to the fixed plate.

Additionally, or alternatively, the movable part may comprise a movable disk comprising, in order to indicate the relative angular orientation, either the graduated angular scale or a radial index intended to be arranged opposite the graduated angular scale.

Such a movable disk may then rotate relative to the axis of rotation and also allow an operator to read a relative angular orientation of the movable part in relation to a fixed disk or indeed directly in relation to the fixed plate.

Advantageously, the tool comprising an angular lock for locking the movable part in position relative to the fixed plate, the angular lock may comprise an indexing pin, this indexing pin comprising a body secured either to the fixed disk or to the movable part and a rod that is able to move in translation relative to the body in a direction AX parallel to the longitudinal direction OX.

In other words, the angular lock may be secured with the fixed disk or with the movable part. The body of the indexing pin is then arranged in a flush-mounted connection with the fixed disk or the movable part via reversible securing means as described previously.

The rod of the indexing pin may be actuated manually by an operator in a first sense of the direction AX parallel to the longitudinal direction OX in order to release the movable part and allow it to rotate about the axis of rotation. An elastic return means, such as a coil spring loaded in tension or compression, may then allow the rod to be moved in a second sense of the direction AX parallel to the longitudinal direction OX in order to immobilize the movable part relative to the fixed disk.

In practice, the movable part comprising a movable disk, the movable disk may have an outer face, the outer face comprising a plurality of notches equally spaced in azimuth about the axis of rotation, each notch comprising a shape complementary to the rod of the indexing pin.

Therefore, when an operator releases the rod of the indexing pin, it moves in the second sense and a free end of the rod engages with one of the notches arranged opposite. Once the rod is inserted into the notch, the movable disk and therefore the movable part can no longer pivot about the axis of rotation. Because the degree of rotational mobility of the movable part is then temporarily inhibited, the movable part is arranged in a temporary flush-mounted connection with the fixed disk and therefore with the fixed plate.

Furthermore, the fixed disk may comprise a fixed opening and the movable part may comprise a movable opening, the fixed opening being arranged opposite the movable opening regardless of an angular positioning of the movable part relative to the fixed disk about the axis of rotation.

Such fixed and movable openings therefore allow the at least one elongate element to pass through the fixed disk and the movable disk.

These fixed and movable openings may be circular or oblong, for example, in order to allow a connection member to pass through the fixed disk and the movable disk.

According to another embodiment, the tool may comprise a movable arm constrained in rotation with the movable part, the at least one immobilization support being mounted on the movable arm.

Such a movable arm is therefore secured in a flush-mounted connection with the movable part, for example via reversible securing means such as screws, nuts or bolts. A first movable arm may be in a first shape suitable for cooperating with a first model connection member. This first movable arm may then optionally be replaced by a second movable arm in a second shape different from the first shape and suitable for cooperating with a second model connection member.

Advantageously, the tool may comprise an adjustment positioner for modifying the positioning of the at least one immobilization support on the movable arm.

In other words, depending on the type, size or orientation of the connection member, the adjustment positioner allow the position of the immobilization support or supports to be adjusted on the movable arm. Such adjustment positioner may, for example, comprise screws, nuts, bolts, ball-and-spring mechanisms, a locking finger, a bayonet system, clamps or the like cooperating, for example, with oblong holes provided in the movable arm.

Once the screws and/or the nuts are at least partially loosened in a complementary clamping member, the immobilization support or supports are capable of being moved in translation, for example in a radial direction OY of the movable arm or indeed in the longitudinal direction OX of fixed plate. Once the position has been adjusted, the screws and/or the nuts may be re-tightened with the complementary clamping member in order to hold the immobilization support or supports in position on the movable arm.

BRIEF DESCRIPTION OF THE DRAWINGS

The disclosure and its advantages appear in greater detail from the following description of examples given by way of illustration with reference to the accompanying figures, in which.

DETAILED DESCRIPTION

As already disclosed, the disclosure relates to the field of tools for manufacturing and checking a harness intended, for example, to equip an aircraft.

Elements present in more than one of the figures may, if appropriate, be given the same references in each of them.

Figure 1:
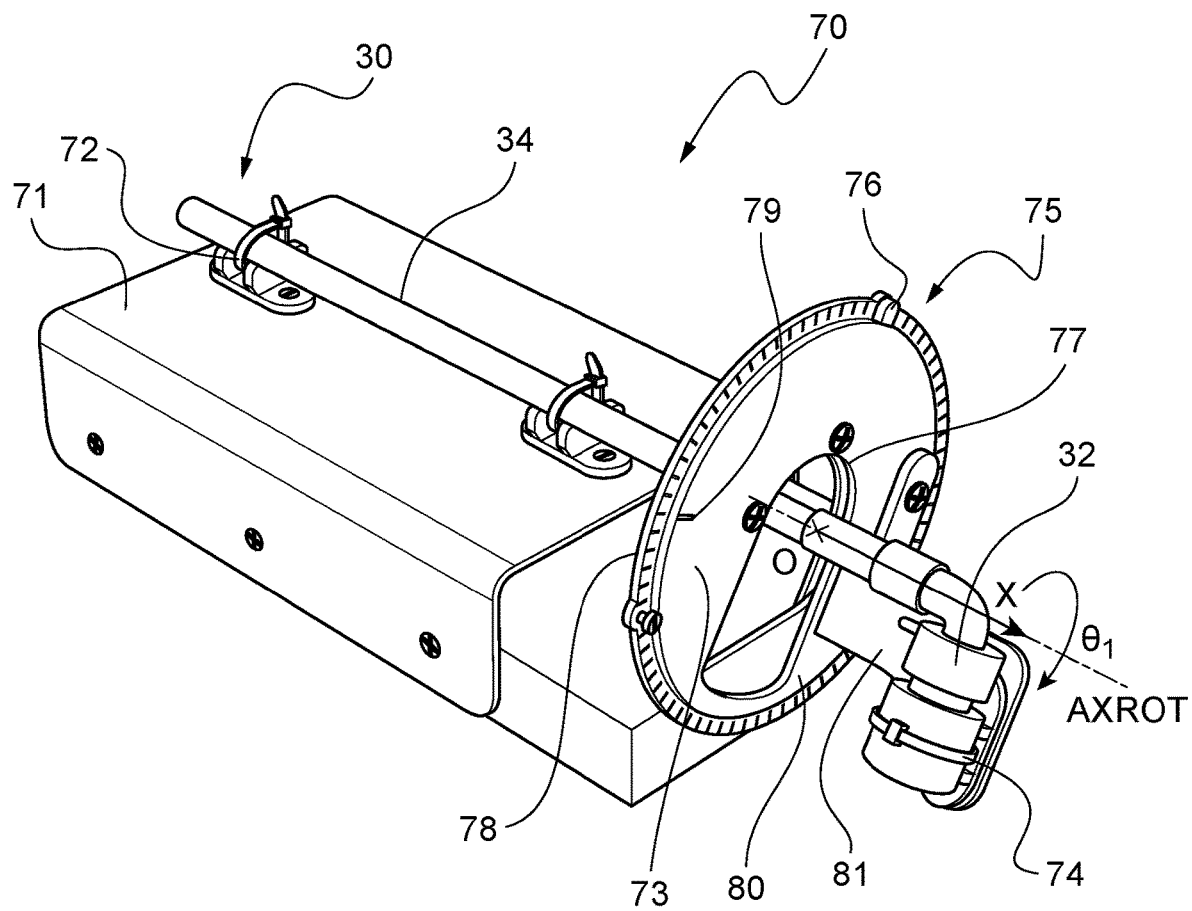
FIG. 1 is a first perspective view of a tool according to the disclosure.

As shown in FIG. 1, the disclosure relates to a tool 70 at least allowing at least one connection member 32 to be angularly positioned and held in position relative to an elongate element 34 according to a relative angular orientation $\theta 1$. Moreover, such a relative angular orientation $\theta 1$ is more particularly defined between two directions in a plane perpendicular to a longitudinal direction OX in which the elongate element 34 extends longitudinally. An elongate element 34 is thus arranged above a planar portion of a fixed plate 71 of the tool 70.

As shown, the connection member 32 may, for example, comprise a 90° angled connector. The elongate element 34 may, for example, comprise at least one connecting wire, at least one cable and/or at least one protective sheath.

Such a tool 70 can then be used to help manufacture a harness 30 by giving the connection member 32 a relative orientation in relation to an elongate element 34.

Another function of this tool 70 may also consist in measuring a relative angular orientation between a model connection member and a model elongate element. This measurement is taken on a model harness mounted, for example, on an aircraft prior to manufacturing the harness 30.

The tool 70 may also be used to check a harness 30 by measuring the relative angular orientation $\theta 1$ on a harness 30 that may or may not be mounted on an aircraft.

This tool 70 thus comprises a fixed plate 71 comprising a planar portion and at least one immobilization device 72 for immobilizing all of part of an elongate element 34 of the harness 30 and securing all or part of this elongate element 34 to the fixed plate 71.

Such immobilization devices 72 may comprise a base secured with the fixed plate 71 via reversible or non-reversible securing means and clamping collars fastened to the base or indeed passing through the base. Such clamping collars allow an elongate element 34 to be clamped to the base of the immobilization devices 72. A pulling force applied to a free end of the clamping collars then immobilizes the elongate element 34 relative to the fixed plate 71.

The tool 70 also comprises a movable part 73 capable of pivoting about an axis of rotation AXROT arranged parallel to the longitudinal direction OX in which the elongate element 34 extends longitudinally. More specifically, such an axis of rotation AXROT advantageously coincides with this longitudinal direction OX of the elongate element 34. Optionally, the axis of rotation AXROT may be arranged parallel to the planar portion of the fixed plate 71.

Furthermore, at least one immobilization support 74 is mounted on the movable part 73 and, for example, on a movable arm 81 secured to a movable disk 80. This or these immobilization supports 74 are thus configured to immobilize the connection member 32 of the harness 30 relative to the movable part 73. The connection member 32 is then secured to the movable part 73.

As previously for the immobilization devices 72, an immobilization support 74 may comprise a base secured to the movable part 73 via reversible or non-reversible securing means and clamping collars or the like fastened to the base.

The tool 70 also comprises a graduated angular scale 75 for reading the relative angular orientation $\theta 1$ between the elongate element or elements 34 and the connection member or members 32.

Moreover, such a tool 70 may advantageously comprise an angular lock 76 for locking the movable part 73 in position relative to the fixed plate 71.

Figure 2:
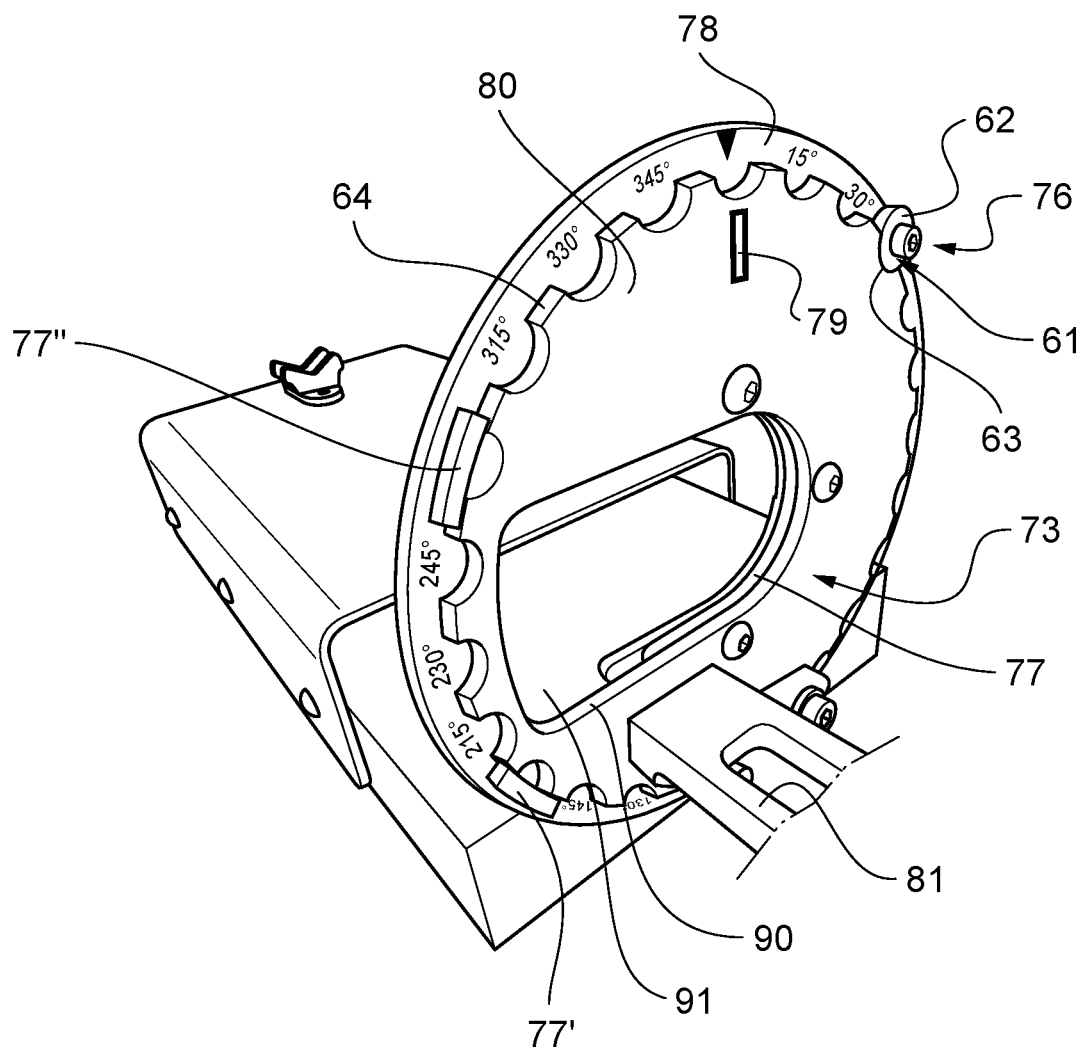
FIG. 2 is a second perspective view according to an initial relative angular orientation of a tool according to the disclosure.
Figure 3:
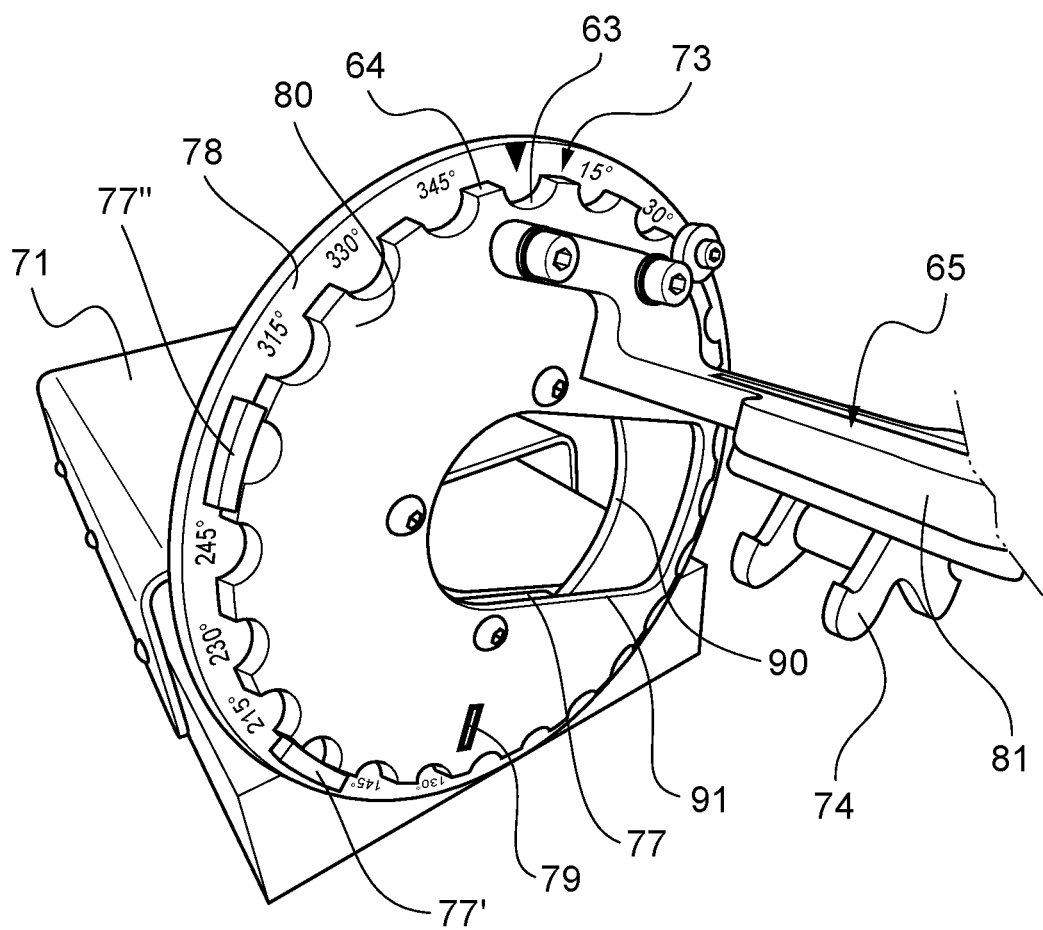
FIG. 3 is a third perspective view according to another relative angular orientation of a tool according to the disclosure.
Figure 4:
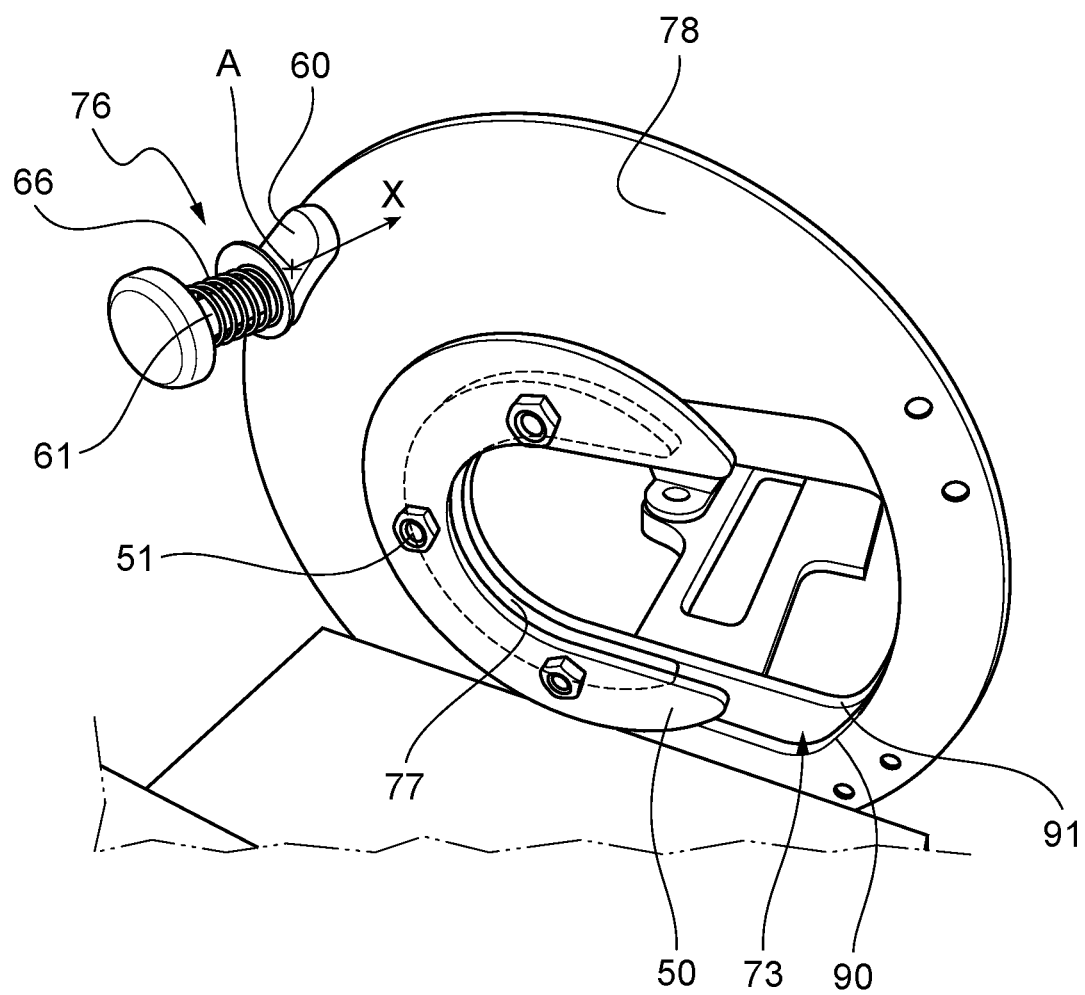
FIG. 4 is a fourth perspective view of a tool according to the disclosure.

As shown in greater detail in FIGS. 2 to 4, such an angular lock 76 may in particular be in the form of an indexing pin comprising a body 60 secured with the fixed plate 71 and a rod 61, the free end 62 of which cooperates with at least one hole or at least one notch 63 of complementary shape provided on the movable part 73.

The rod 61 may be actuated manually by an operator in a first sense of a direction AX parallel to the longitudinal direction OX in order to release the movable part 73 and allow it to rotate about the axis of rotation AXROT. An elastic return means 66, such as a coil spring loaded in tension or compression, then allows the rod 61 to be moved in a second sense of the direction AX in order to immobilize the movable part 73 relative to the fixed plate 71. According to another example not shown here, the body 60 may also be secured with the movable part 73 and the free end 62 of the rod 61 then cooperates with a notch or a hole provided on the fixed plate 71.

Naturally, other angular lock not shown here may also be envisaged and comprise, for example, a pad and a braking system, or indeed a circular rack or a toothed wheel cooperating with at least one pawl.

Furthermore, the tool 70 may comprise at least one guide bearing 77, 77', 77" for guiding the movable part 73 in rotation about the axis of rotation AXROT. Such an at least one guide bearing 77, 77', 77" is also configured to provide a passage and allow the harness 34 and the end element 32 to be positioned coaxially at this axis of rotation AXROT.

Such guide bearings 77, 77', 77" may in particular be made from a material with a low coefficient of friction such a polytetrafluoroethylene (PTFE). The guide bearings 77', 77" may comprise several cylindrical portions secured with a fixed disk 78 secured to the fixed plate 71. Another guide bearing 77 may be secured to the movable part 73.

Optionally, other types of guide bearing may be used and comprise, for example, at least one bronze ring, or at least one roller bearing with rolling elements such as balls, rollers or needles.

As shown, such a fixed disk 78 may comprise the graduated angular scale 75 for indicating the relative angular orientation $\theta 1$. Moreover, the body 60 may advantageously be secured with such a fixed disk 78.

The movable part 73 may comprise a movable disk 80 comprising, in order to indicate the relative angular orientation $\theta 1$, a radial index 79 intended to be arranged opposite the graduated angular scale 75. According to another example not shown here, the movable part 73 may comprise a movable disk 80 comprising, in order to indicate the relative angular orientation θ1, the graduated angular scale 75. In this case, the radial index 79 may be arranged on the fixed plate 71 or indeed on a part secured to the fixed plate 71.

Such a movable disk 80 may have an outer face 64 comprising a plurality of notches 63 equally spaced in azimuth about the axis of rotation AXROT. As indicated above, each notch 63 has a shape complementary to an end 62 of the rod 61 of the locking finger.

Furthermore, this movable part 73 may comprise a movable arm 81 on which the immobilization support or supports 74 are mounted.

Moreover, as shown in FIG. 3, the tool 70 may also comprise an adjustment positioner 65 allowing the positioning of the immobilization support 74 to be modified relative to the movable arm 81. Thus, depending on the type, the orientation or the size of the connection member 32, it may be advantageous to use the adjustment positioner 65 to adapt the position of the immobilization support 74 on the movable arm 81.

Such adjustment positioner 65 may in particular comprise oblong holes, for example, and reversible securing means, such as screws, in particular. The oblong holes are provided in the movable arm 81 and/or in a base of an immobilization support 74 and make it possible, for example, to move this immobilization support 74 in translation relative to the movable arm 81 in a direction parallel to the longitudinal direction OX.

Furthermore, the fixed disk 78 may comprise a fixed opening and the movable part 73 may comprise a movable opening 91. Furthermore, the fixed opening 90 constantly remains arranged at least partially opposite the movable opening 91 when the movable part 73 is rotating. Therefore, an elongate element 34 constantly passes through the fixed opening 90 and the movable opening 91.

These fixed 90 and movable 91 openings are, in particular, configured such that an operator may, for example, carry out a contraction operation on a shrink sleeve arranged so as to at least partially cover a connection member 32 once oriented by means of the tool 70 according to the relative angular orientation θ1 between the elongate element 34 and the connection member 32. These fixed 90 and movable 91 openings may also allow an operator to make markings on the elongate element 34 and a connection member 32 in the event that a harness having high torsional rigidity is being manufactured. Once the making has been made, the operator may then remove the harness from the tool 70, for example in order to crimp the connection member 32 with the elongate element 34.

Such fixed 90 and movable 91 openings may also allow an operator to directly crimp a connection member 32 once oriented by means of the tool 70 according to the relative angular orientation θ1 between the elongate element 34 and the connection member 32.

Moreover, as shown in FIG. 4, the movable part 73 may comprise a plate component 50 and reversible securing means 51 such as screws and nuts, in particular. The plate component 50 is secured with the movable disk 80 and prevents the movable part 73 from moving in translation relative to the fixed disk 80 in the longitudinal direction OX. The guide bearing 77 is then interposed in the longitudinal direction OX between the movable disk 80 and the plate component 50 in order to come into contact with the fixed disk 78.

Next, in order to manufacture a harness 30, an operator positions an elongate element 34 on the bases of two immobilization devices 72. One end of the elongate element 34 is inserted through the fixed disk 78 and the movable disk 80 at a fixed opening 90 and a movable opening 91 respectively.

For example, this end of the elongate element 34 may comprise a connection member 32 and a shrink sleeve arranged in a non-contracted state so as to partially cover the elongate element 34 and the connection member 32.

The elongate element 34 having, for example, a protective sheath and at least one connecting wire, the protective sheath is then secured with the fixed plate 71 by means of the two immobilization devices 72. The movable part 73 is then oriented in an initial position in which the radial index 79 is arranged opposite a value of 0° on the graduated angular scale 75.

The connection member 32 is then immobilized relative to the movable arm 81 by means of an immobilization support 74 arranged on the movable part 73. The operator then rotates the movable part about the axis of rotation AXROT by the relative angular orientation θ1 that he or she may read directly by looking at the position of the radial index 79 on the graduated angular scale 75.

Once the corresponding angular position is reached, the operator actuates the angular lock 76. He or she may then perform a contraction operation on the shrink sleeve, which sets the relative angular orientation θ1 between the connection member 32 and the protective sheath of the elongate element 34 or, in the case of a harness with very high torsional rigidity and/or a large cross-section, make marks arranged opposite each other on the connection member 32 and the elongate element 34.

The two immobilization devices 72 and the immobilization support 74 are then operated by the operator in order to allow the tool to be released from this portion of the harness 30.

Moreover, as already indicated, such a tool 70 may also be used to take a measurement of the relative angular orientation θ1 on a previously manufactured harness.

In this case, the elongate element 34 is secured with the fixed plate 71 in a reference position and the movable part 73 is rotated about the axis of rotation AXROT until the connection member 32 comes into contact with the immobilization support 74, in the case of a connection member 32 formed by an angled connector, or until the immobilization support 74 is radially opposite a locating pin of the connection member 32 formed a straight connector.

Once the movable part 73 has been moved, it is immobilized relative to the fixed disk 78, and the operator may then read the relative angular orientation θ1 between the connection member 32 and the protective sheath of the elongate element 34.

Naturally, the present disclosure is subject to numerous variations as regards its implementation. Although several implementations are described above, it should readily be understood that an exhaustive identification of all possible embodiments is not conceivable. It is naturally possible to replace any of the means described with equivalent means without going beyond the ambit of the present disclosure.

What is claimed is:

1. An angular orientation tool for manufacturing and checking a harness, the harness comprising at least one connection member and at least one elongate element, wherein the tool comprises:

a fixed plate comprising a planar portion;

at least one immobilization device for immobilizing all of part of the at least one elongate element and securing all or part of the at least one elongate element to the fixed plate;

a movable part having a degree of rotational mobility in relation to the fixed plate about an axis of rotation, the axis of rotation being arranged parallel to a longitudinal direction along which the at least one elongate element extends longitudinally on the fixed plate;

at least one immobilization support configured to immobilize the at least one connection member relative to the movable part and secure the at least one connection member to the movable part; and a graduated angular scale for reading a relative angular orientation between the at least one elongate element and the at least one connection member, the relative angular orientation being defined in a plane perpendicular to the longitudinal direction in which the at least one elongate element extends longitudinally on the fixed plate.

2. The tool according to claim 1
wherein the tool comprises an angular lock for locking the movable part in position relative to the fixed plate.

3. The tool according to claim 1
wherein the tool comprises at least one guide bearing for guiding the movable part in rotation about the axis of rotation.

4. The tool according to claim 1
wherein the tool comprises a fixed disk secured to the fixed plate, the fixed disk comprising, in order to indicate the relative angular orientation, either the graduated angular scale or a radial index intended to be arranged opposite the graduated angular scale.

5. The tool according to claim 1
wherein the movable part comprises a movable disk comprising, in order to indicate the relative angular orientation, either the graduated angular scale or a radial index intended to be arranged opposite the graduated angular scale.

6. The tool according to claim 4
wherein the tool comprising an angular lock for locking the movable part in position relative to the fixed plate, the angular lock comprises an indexing pin, the indexing pin comprising a body secured either to the fixed disk or to the movable part and a rod that is able to move in translation relative to the body in a direction AX parallel to the longitudinal direction OX.

7. The tool according to claim 6
wherein the movable part comprising a movable disk, the movable disk has an outer face, the outer face comprising a plurality of notches equally spaced in azimuth about the axis of rotation, each notch comprising a shape complementary to the rod of the indexing pin.

8. The tool according to claim 4
wherein the fixed disk comprises a fixed opening and the movable part comprises a movable opening, the fixed opening being arranged opposite the movable opening regardless of an angular positioning of the movable part relative to the fixed disk about the axis of rotation.

9. The tool according to claim 1
wherein the tool comprises a movable arm constrained in rotation with the movable part, the at least one immobilization support being mounted on the movable arm.

10. The tool according to claim 9
wherein the tool comprises an adjustment positioner for modifying the positioning of the at least one immobilization support on the movable arm.

* * * * *